(12) United States Patent
Mishra et al.

(10) Patent No.: US 11,907,149 B2
(45) Date of Patent: Feb. 20, 2024

(54) SIDEBAND SIGNALING IN UNIVERSAL SERIAL BUS (USB) TYPE-C COMMUNICATION LINKS

(71) Applicant: QUALCOMM Incorporated, San Diego, CA (US)

(72) Inventors: Lalan Jee Mishra, San Diego, CA (US); Richard Dominic Wietfeldt, San Diego, CA (US); Yiftach Benjamini, Givat Ela (IL)

(73) Assignee: QUALCOMM Incorporated, San Diego, CA (US)

( * ) Notice: Subject to any disclaimer, the term of this patent is extended or adjusted under 35 U.S.C. 154(b) by 33 days.

(21) Appl. No.: 17/116,454

(22) Filed: Dec. 9, 2020

(65) Prior Publication Data

US 2022/0179814 A1    Jun. 9, 2022

(51) Int. Cl.
*G06F 13/38* (2006.01)
*G06F 13/42* (2006.01)

(52) U.S. Cl.
CPC ........ *G06F 13/385* (2013.01); *G06F 13/4213* (2013.01); *G06F 13/4226* (2013.01); *G06F 2213/0042* (2013.01)

(58) Field of Classification Search
CPC ............... G06F 13/385; G06F 13/4213; G06F 13/4226; G06F 2213/0042
See application file for complete search history.

(56) References Cited

U.S. PATENT DOCUMENTS 7,104,848 B1* 9/2006 Chou ..................... H01R 27/02
439/660
7,108,560 B1* 9/2006 Chou ............... G06K 19/07732
439/660
7,756,917 B2* 7/2010 DeHart ............. H04L 29/12207
709/200
8,032,261 B1* 10/2011 Beauchamp ............ G06F 1/206
318/599
9,432,298 B1* 8/2016 Smith ..................... H04L 47/34
(Continued)

FOREIGN PATENT DOCUMENTS

WO         2017074635 A1    5/2017

OTHER PUBLICATIONS

Invitation to Pay Additional Fees and Partial International Search for International Patent Application No. PCT/US2021/071837, dated Feb. 11, 2022, 13 pages.

(Continued)

*Primary Examiner* — Henry Tsai
*Assistant Examiner* — Aurangzeb Hassan
(74) *Attorney, Agent, or Firm* — W&T/Qualcomm

(57) ABSTRACT

Sideband signaling in Universal Serial Bus (USB) Type-C communication link allows multiple protocols that are tunneled through a USB link, where sideband signals may be provided through the sideband use (SBU) pins. Further, the SBU pins may be transitioned between different modes of sideband signals. In particular, signals in an initial mode may indicate a need or desire transition to a second mode. After a negotiation, linked devices agree to transition, the two devices may transition to the second mode. By providing this inband sideband signaling that allows mode changes, more protocols can be tunneled with accompanying sideband signaling and flexibility of the USB link is expanded.

19 Claims, 10 Drawing Sheets

(56) References Cited

U.S. PATENT DOCUMENTS

| | | | |
|---|---|---|---|
| 10,339,093 B2* | 7/2019 | Srivastava | G06F 13/385 |
| 10,353,853 B1* | 7/2019 | Khamesra | G06F 13/362 |
| 11,100,034 B1* | 8/2021 | Vispute | G06F 1/266 |
| 11,520,727 B2 | 12/2022 | Mishra et al. | |
| 2005/0237991 A1* | 10/2005 | Dybsetter | H04L 25/00 |
| | | | 370/349 |
| 2015/0309951 A1* | 10/2015 | Breakstone | G06F 13/4022 |
| | | | 710/313 |
| 2016/0259005 A1* | 9/2016 | Menon | G06F 11/364 |
| 2018/0225230 A1* | 8/2018 | Litichever | G06F 13/107 |
| 2018/0314667 A1* | 11/2018 | Long | G06F 13/1668 |
| 2019/0227971 A1* | 7/2019 | O'Shea | G06F 13/4282 |
| 2020/0242070 A1 | 7/2020 | Bisson et al. | |
| 2020/0278733 A1* | 9/2020 | Li | G06F 13/4295 |
| 2021/0271619 A1* | 9/2021 | Bhavsar | G06F 13/4291 |
| 2022/0046114 A1* | 2/2022 | Entelis | H04L 69/04 |

OTHER PUBLICATIONS

International Search Report and Written Opinion for International Patent Application No. PCT/US2021/071837, dated Apr. 4, 2022, 17 pages.

* cited by examiner

SIDEBAND SIGNALING IN UNIVERSAL SERIAL BUS (USB) TYPE-C COMMUNICATION LINKS

BACKGROUND

I. Field of the Disclosure

The technology of the disclosure relates generally to sideband signaling over a Universal Serial Bus (USB) Type-C communication link.

II. Background

Computing devices abound in modern society. The prevalence of such computing devices is attributable in part to the many functions that the computing devices may provide. Many devices are designed to couple to a computing device to expand or augment the functionality of the computing device. For example, user interface devices (e.g., a mouse) or an output device (e.g., a printer or a monitor) may be coupled to a computing device to provide additional functionality. Various standards have evolved to facilitate such device coupling. One popular standard is the Universal Serial Bus (USB) standard. The USB Implementers Forum (USB-IF) has announced USB 4.0, which will allow tunneling of other protocols and use a Type-C form factor for connectors. The announcement of USB 4.0 provides new opportunities to improve functionality thereof.

SUMMARY OF THE DISCLOSURE

Aspects disclosed in the detailed description include sideband signaling in Universal Serial Bus (USB) Type-C communication links. In particular, when multiple protocols are tunneled through a USB link, sideband signals may be provided through the sideband use (SBU) pins. Further, the SBU pins may be transitioned between different modes of sideband signals. In particular, signals in an initial mode may indicate a need or desire transition to a second mode. After a negotiation, the linked devices agree to transition, the two devices may transition to the second mode. By providing this inband sideband signaling that allows mode changes, more protocols can be tunneled with accompanying sideband signaling and flexibility of the USB link is expanded.

In this regard in one aspect, an integrated circuit (IC) is disclosed. The IC includes a two-wire interface. The IC also includes a control circuit coupled to the two-wire interface. The control circuit is configured, using an initial protocol, to negotiate a transition to a second protocol for communications with a remote IC over the two-wire interface. The control circuit is also configured to transition to using the second protocol. The control circuit is also configured to operate using the second protocol.

In another aspect, an IC is disclosed. The IC includes a two-wire interface. The IC also includes a control circuit coupled to the two-wire interface. The control circuit is configured, while in an idle mode, to hold at least one wire of the two-wire interface in a default idle mode. The control circuit is also configured to determine that a wake up is needed. The control circuit is also configured to wake up the IC. The control circuit is also configured to drive the at least one wire of the two-wire interface to initiate the wake up at the remote IC.

In another aspect, an IC is disclosed. The IC includes a two-wire interface. The IC also includes a control circuit coupled to the two-wire interface. The control circuit is configured, while in an idle mode, to hold at least one wire of the two-wire interface in a default idle mode. The control circuit is also configured to detect a transition on the at least one wire to a changed mode different than the idle mode. The control circuit is also configured, responsive to the transition on the at least one wire, to begin a wake-up process.

In another aspect, a method is disclosed. The method includes, at a first IC using an initial protocol, negotiating a transition to a second protocol for communications with a remote IC over a two-wire interface. The method also includes transitioning to using the second protocol. The method also includes operating using the second protocol.

In another aspect, a method is disclosed. The method includes, at a first IC, while in an idle mode, holding at least one wire of a two-wire interface in a default idle mode. The method also includes determining that a wake up is needed. The method also includes waking up the first IC. The method also includes driving the at least one wire of the two-wire interface to initiate the wake up at the remote IC.

In another aspect, a method is disclosed. The method includes, at a first IC while in an idle mode, holding at least one wire of a two-wire interface in a default idle mode. The method also includes detecting a transition on the at least one wire to a changed mode different than the idle mode. The method also includes, responsive to the transition on the at least one wire, beginning a wake-up process.

In another aspect, a computing system is disclosed. The computing system includes a communication bus including a two-wire bus. The computing system also includes a first IC. The first IC includes a first two-wire interface coupled to the two-wire bus. The first IC also includes a first control circuit coupled to the first two-wire interface. The first control circuit is configured, using an initial protocol, to negotiate a transition to a second protocol for communications with a secondary IC over the two-wire interface. The first control circuit is also configured to transition to using the second protocol. The first control circuit is also configured to operate using the second protocol. The computing system also includes the secondary IC. The secondary IC includes a secondary two-wire interface coupled to the two-wire bus. The secondary IC also includes a secondary control circuit coupled to the secondary two-wire interface. The secondary control circuit is configured, responsive to negotiations from the first control circuit, to transition to using the second protocol. The secondary control circuit is also configured to operate using the second protocol.

DETAILED DESCRIPTION

Figure 1:
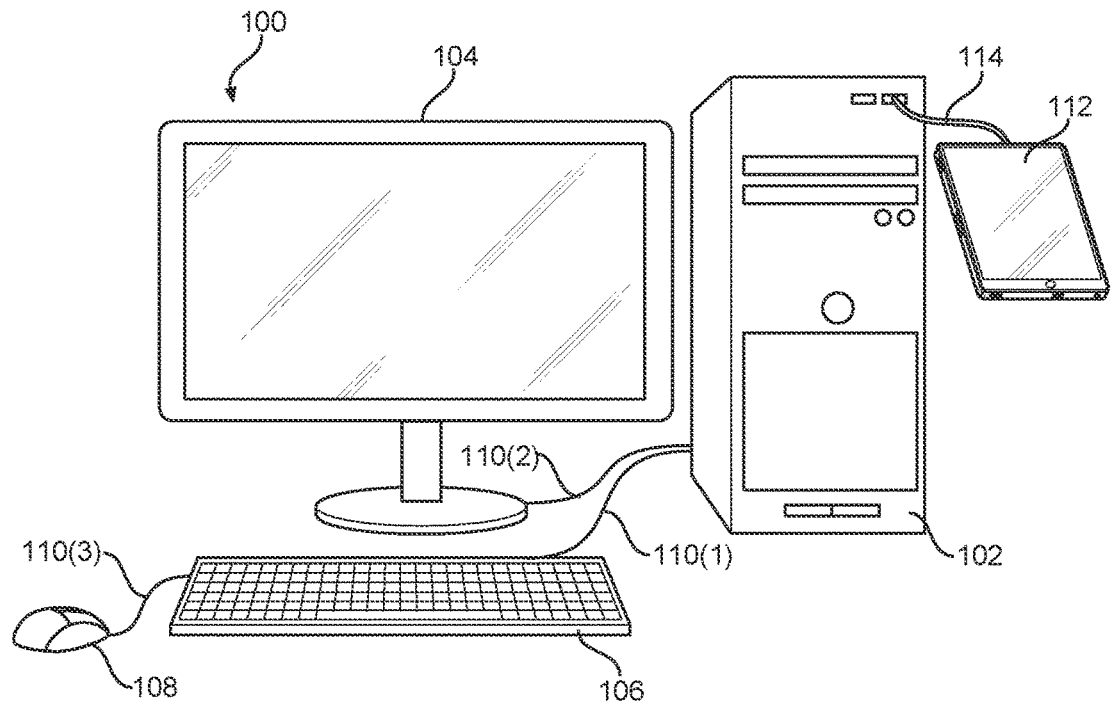
FIG. 1 is a stylized mobile computing device coupled to a remote peripheral through a Universal Serial Bus (USB) communication link.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include sideband signaling in Universal Serial Bus (USB) Type-C communication links. In particular, when multiple protocols are tunneled through a USB link, sideband signals may be provided through the sideband use (SBU) pins. Further, the SBU pins may be transitioned between different modes of sideband signals. In particular, signals in an initial mode may indicate a need or desire transition to a second mode. After a negotiation, linked devices agree to transition, the two devices may transition to the second mode. By providing this inband sideband signaling that allows mode changes, more protocols can be tunneled with accompanying sideband signaling and flexibility of the USB link is expanded.

Figure 2:
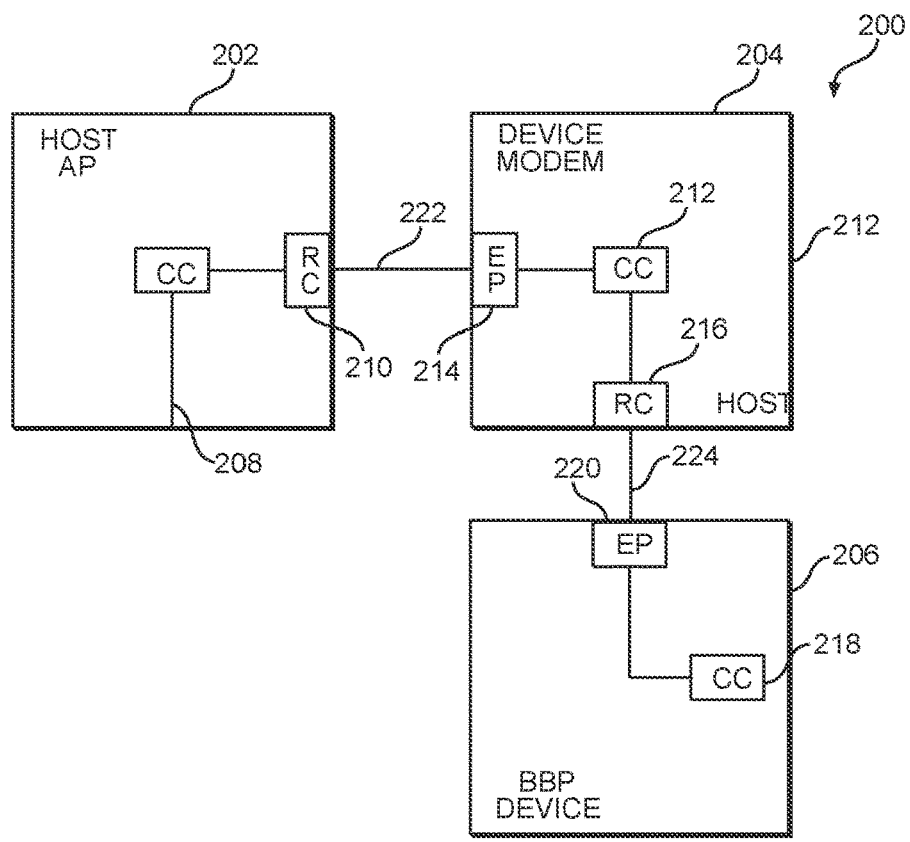
FIG. 2 is a block diagram of integrated circuits (ICs) within the computing device of FIG. 1 communicating over USB communication links.
Figure 3:
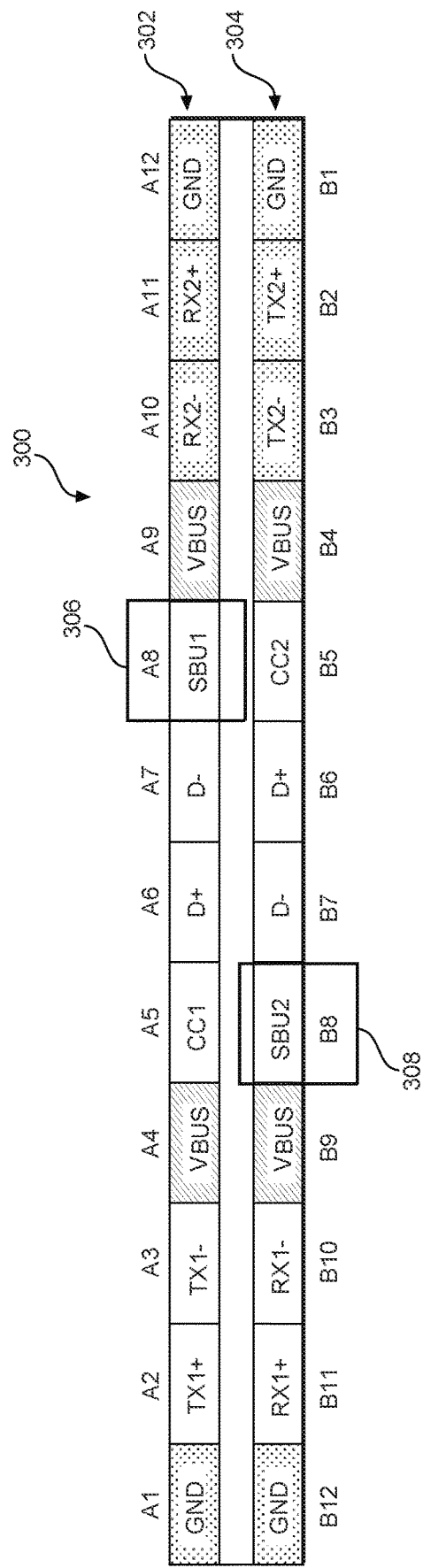
FIG. 3 is a diagram of a pin layout in a USB Type-C connector.

Before addressing specific examples of sideband signaling and how a sideband communication link may change modes according to the present disclosure, a brief overview of possible environments in which a USB communication link may exist is provided with reference to FIGS. 1 and 2, while a USB Type-C connector is illustrated in FIG. 3. A discussion of the actual sideband channel begins below with reference to FIG. 4.

In this regard, FIG. 1 illustrates a computing system 100. The computing system 100 may include a main computer housing 102 that contains a processor (not shown) and is coupled to a monitor 104, a keyboard 106, and a mouse 108 through cables 110(1)-110(3). While not shown, other user interface elements may also be present and coupled to the main computer housing 102 through a cable. One or more of the cables 110(1)-110(3) may be a USB Type-C cable. Further, the main computer housing 102 may be coupled to another computing device 112 such as a tablet through a USB Type-C cable 114.

While USB is commonly thought of as an external connection requiring manual manipulation (e.g., insertion or extraction) of a connector into a receptacle, USB 4.0 is being adopted in chip-to-chip communication. In this regard, FIG. 2 illustrates a computing system 200 (perhaps positioned within the main computer housing 102) that may include a first integrated circuit (IC) 202, which may be an application processor (AP) or the like, a second IC 204, which may be a modem or the like, and a third IC 206, which may be a baseband processor (BBP) or the like. The first IC 202 may include a control circuit 208 and a root complex circuit 210. The second IC 204 may include a control circuit 212, an endpoint circuit 214, and a root complex circuit 216. The third IC 206 may include a control circuit 218 and an endpoint circuit 220. The root complex circuit 210 may be coupled to the endpoint circuit 214 through a first USB communication link 222, and the root complex circuit 216 may be coupled to the endpoint circuit 220 through a second USB communication link 224. It should be appreciated that the second IC 204 may be a slave or secondary device relative to the first IC 202, but may be a host relative to the third IC 206. As these are IC level connections, there may be no connector or receptacle, but the pins and lines within the respective circuits are dictated by the USB Type-C standard, and the bus interfaces (not shown) may omit the receptacle/connector portion that is common on external USB connections.

FIG. 3 illustrates a standard USB Type-C connector 300 having a top row 302 and a bottom row 304, which are inverted mirror images of each other to allow insertion in either direction. The pin layout is summarized in Table 1 below.

TABLE 1

USB Type-C connector pinouts

| Pin | Name | Description |
| --- | --- | --- |
| A1 | GND | Ground return |
| A2 | TX1+ | SS differential pair #1 TX positive |
| A3 | TX1− | SS differential pair #1 TX negative |
| A4 | VBUS | Bus power |
| A5 | CC1 | Configuration channel |
| A6 | D+ | USB 2.0 differential pair, positive |
| A7 | D− | USB 2.0 differential pair, negative |
| A8 | SBU1 | Sideband use |
| A9 | VBUS | Bus power |
| A10 | RX2− | SS differential pair #2, RX negative |
| A11 | RX2+ | SS differential pair #2, RX positive |
| A12 | GND | Ground return |
| B12 | GND | Ground return |
| B11 | RX1+ | SS differential pair #1, RX positive |
| B10 | RX1− | SS differential pair #1, RX negative |
| B9 | VBUS | Bus power |
| B8 | SBU2 | Sideband use |
| B7 | D− | USB differential pair, negative |
| B6 | D+ | USB differential pair, positive |
| B5 | CC2 | Configuration channel |
| B4 | VBUS | Bus power |
| B3 | TX2− | SS differential pair #2, TX negative |
| B2 | TX2+ | SS differential pair #2, TX positive |
| B1 | GND | Ground return |

Even where there is not an explicit connector or receptacle, a USB connection such as the USB communication links 222, 224 will have pins and links corresponding to the pins of Table 1. Of interest to the present disclosure are SBU pins 306 and 308, which are designated by the USB standard as sideband use pins. In general, the sideband use will be low frequency, at least relative to the super-speed, high-speed, or full-speed contemplated on the primary data lines (e.g., D+, D−, TX1, TX2, RX1, RX2). The USB 4.0 specification contemplates using the sideband in a default Universal Asynchronous Receiver/Transmitter (UART) mode, but permits other protocols to be used. However, despite allowing for the possibility that other protocols may be used on the SBU pins, the USB 4.0 specification is silent as to how to transition to or between such other possible protocols. Exemplary aspects of the present disclosure provide a mechanism for inband signaling on the sideband channel (i.e., across the SBU pins 306, 308 and associated links) to allow for transitions to and between other protocol formats. For example, line multiplex UART (LM-UART), system power management interface (SPMI), radio frequency front end (RFFE), I2C, I3C, or other similar low-speed protocols may be used over the sideband channel. In an exemplary aspect, the transition between such low-speed protocols is negotiated by using messages within the currently active mode and may be made without having to return to the default UART protocol. Still further, a common wake-up scheme that works across any of the protocols may be implemented to assist in preserving low-power modes.

Figure 4:
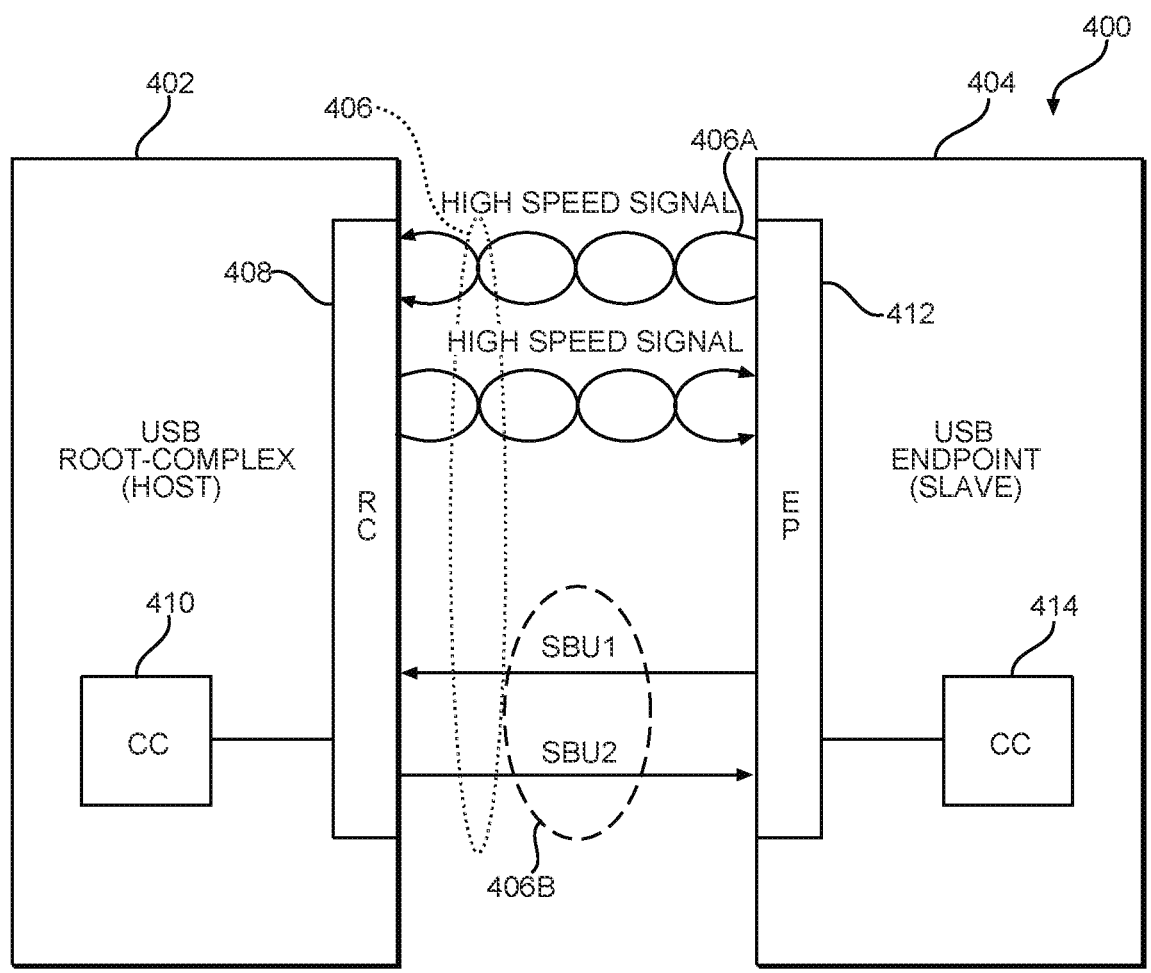
FIG. 4 is a block diagram of two ICs communicating over a USB communication link with the low-speed links visually separated from the high-speed links.

In this regard, FIG. 4 illustrates a USB subsystem 400 having a host IC 402 and a slave (secondary) or endpoint IC 404 coupled by a USB communication link 406. The USB communication link 406 includes a high-speed link 406A and a low-speed link 406B, which may be the SBU link. The host IC 402 includes a root complex circuit 408 as well as a host control circuit 410. Similarly, the endpoint IC 404 includes an endpoint circuit 412 and an endpoint control circuit 414. It should be appreciated that the root complex circuit 408 may be or has a bus interface (not shown) that is configured to couple to the USB communication link 406, and the endpoint circuit 412 may be or has an endpoint bus interface (not shown) that is configured to couple to the USB communication link 406.

Figure 5:
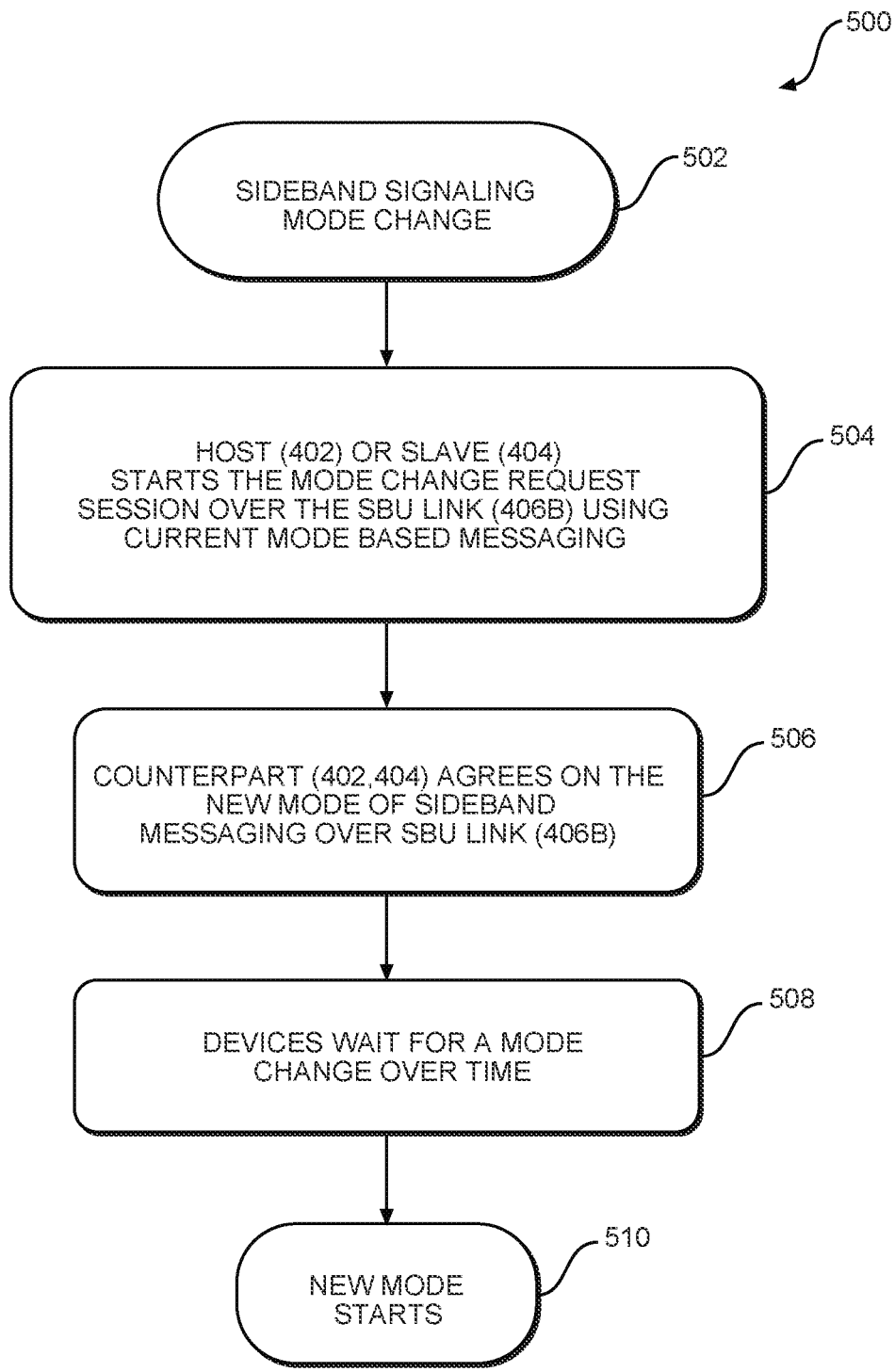
FIG. 5 is a flowchart illustrating an exemplary process for changing modes for sideband signaling in a USB communication link.

A simplified mode change process is shown in FIG. 5 with process 500 starting with a sideband signaling mode change (block 502). The host IC 402 or the secondary IC 404 starts the mode change request session over the SBU link (e.g., 406B) using the current-mode based messaging (block 504). The other one of the host IC 402 or the secondary IC 404 (i.e., the counterpart) agrees to the new mode of sideband messaging over the SBU link (e.g., 406B) (block 506). The two ICs 402, 404 wait for a mode change over time (block 508) and the new mode starts (block 510).

Figure 6:
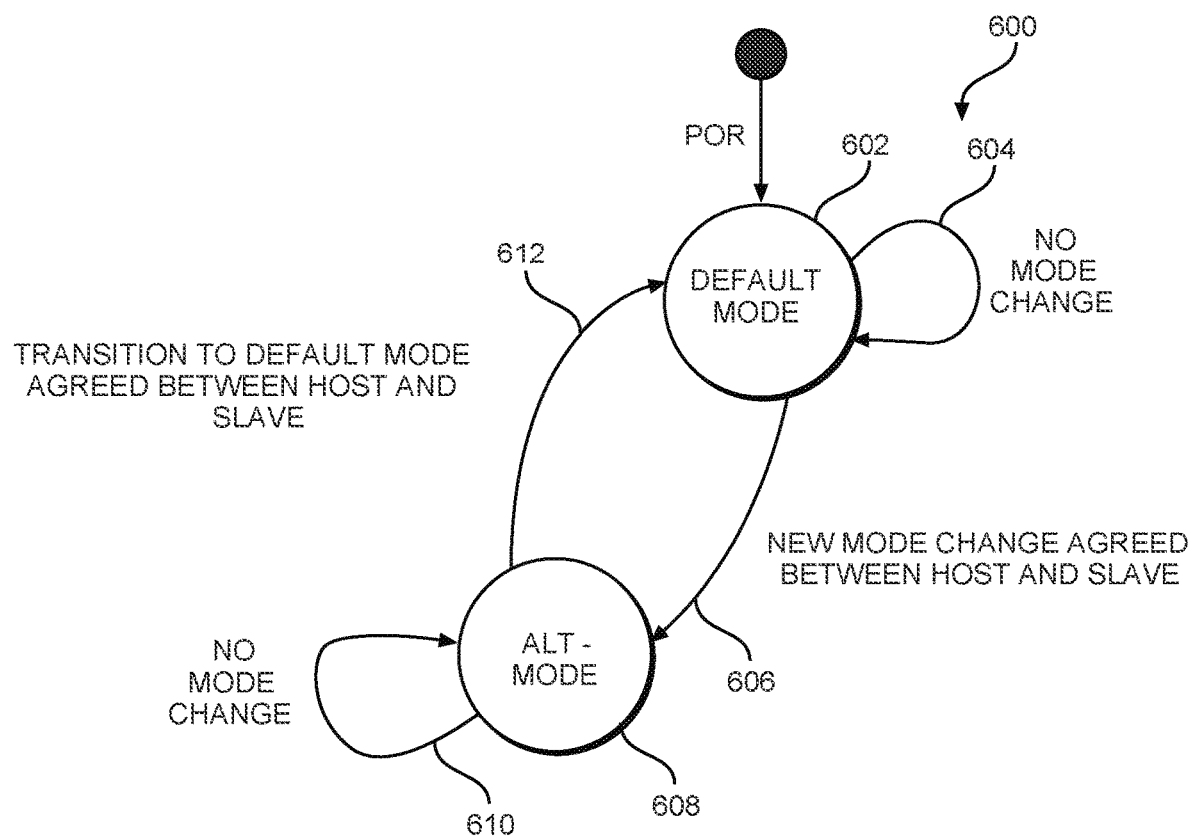
FIG. 6 is a state diagram for a state machine within an IC capable of changing modes for sideband signaling.

FIG. 6 illustrates how a state machine 600 within a host IC 402 or secondary IC 404 (perhaps within a control circuit 410 or 414) may change as the process 500 is executed. The state machine 600 starts after a power on reset (POR). Specifically, the state machine 600 may enter a first default mode 602 (e.g., UART mode). While there is no mode change, the state machine 600 stays (line 604) in the first default mode 602. Once the ICs have agreed to a mode change (line 606), the state machine may transition to an alternate mode 608. The state machine 600 may stay in the alternate mode 608 as long as there no mode change (line 610). However, if the ICs agree to transition to the first default mode 602 (line 612), the state machine 600 returns to the first default mode 602.

Figure 7:
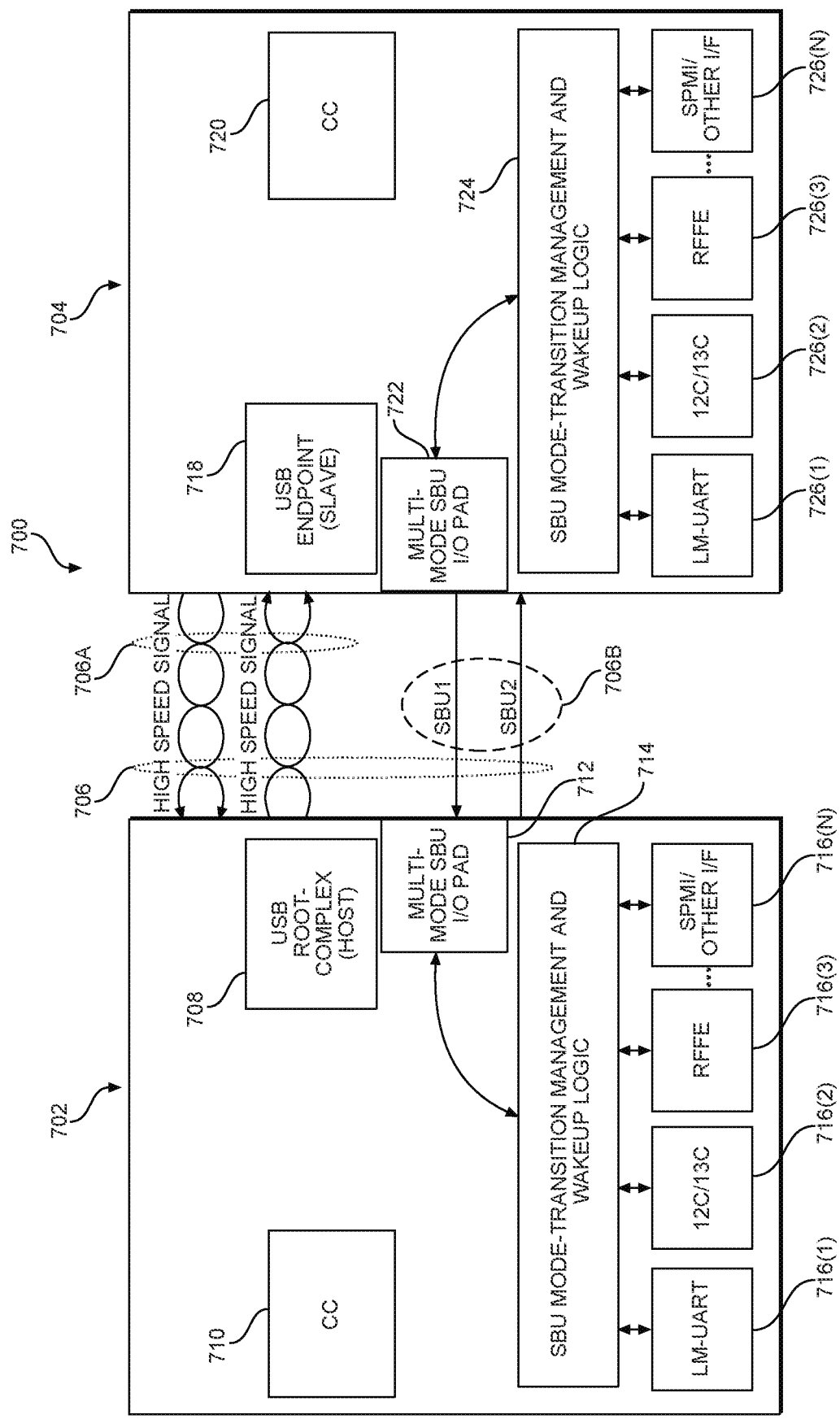
FIG. 7 is a block diagram of two ICs communicating over a USB communication link with various tunneled protocol applications shown.

While the ability to transition to a single alternate mode would be an improvement over the USB specification, the present disclosure is not so limited. Exemplary aspects of the present disclosure allow for a plurality of alternate modes. In this regard, FIG. 7 illustrates a computing system 700 with a host IC 702 and a slave (secondary) or endpoint IC 704 coupled by a USB communication link 706. The USB communication link 706 includes a high-speed link 706A and a low-speed link 706B, which may be the SBU link. The host IC 702 includes a root complex circuit 708 as well as a host control circuit 710. Further, the host IC 702 may include a host bus interface 712 that acts as a multi-mode SBU input/output (I/O) pad. The host bus interface 712 may communicate with an SBU mode-transition management and wake-up logic circuit 714. The SBU mode-transition management and wake-up logic circuit 714 works with low-speed logic circuits 716(1)-716(N) that provide circuitry for a given low-speed protocol such as, for example, LM-UART, I2C or I3C, RFFE, SPMI, or some other two-wire based protocol.

Similarly, the endpoint IC 704 includes an endpoint circuit 718 and an endpoint control circuit 720. Further, the endpoint IC 704 may include an endpoint bus interface 722 that acts as a multi-mode SBU input/output (I/O) pad. The endpoint bus interface 722 may communicate with an endpoint SBU mode-transition management and wake-up logic circuit 724. The endpoint SBU mode-transition management and wake-up logic circuit 724 works with low-speed logic circuits 726(1)-726(N) corresponding to the equivalent low-speed logic circuits 716(1)-716(N) in the host IC 702.

Figure 8:
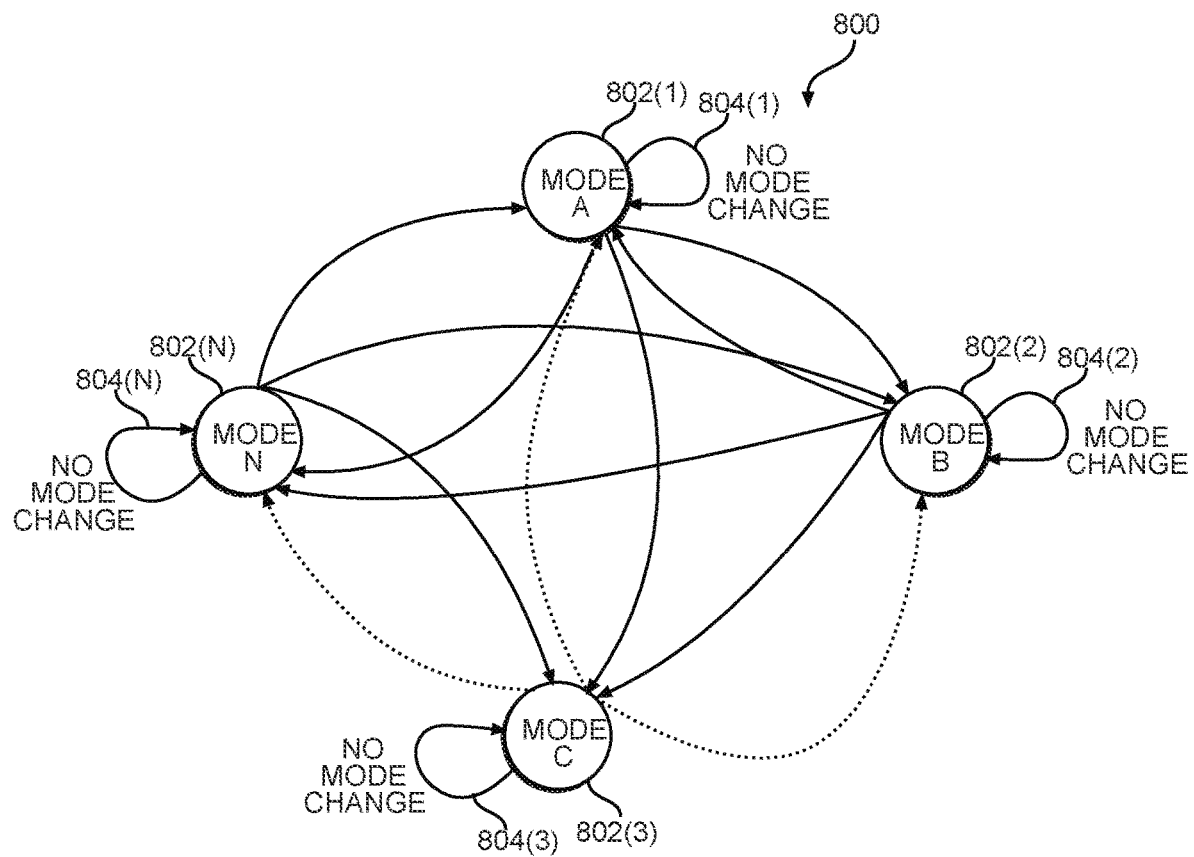
FIG. 8 is a state diagram for a state machine of one of the ICs of FIG. 7.

FIG. 8 provides a state diagram for a state machine 800 that may reside within the host IC 702 or the endpoint IC 704 as they transition from different modes. In particular, the state machine may be in any of modes 802(1)-802(N). The state machine 800 may stay in a given mode 802(1)-802(N) as evidenced by no mode change lines 804(1)-804(N) or may switch to any other mode without having to return to a default mode (e.g., UART).

Figure 9A:
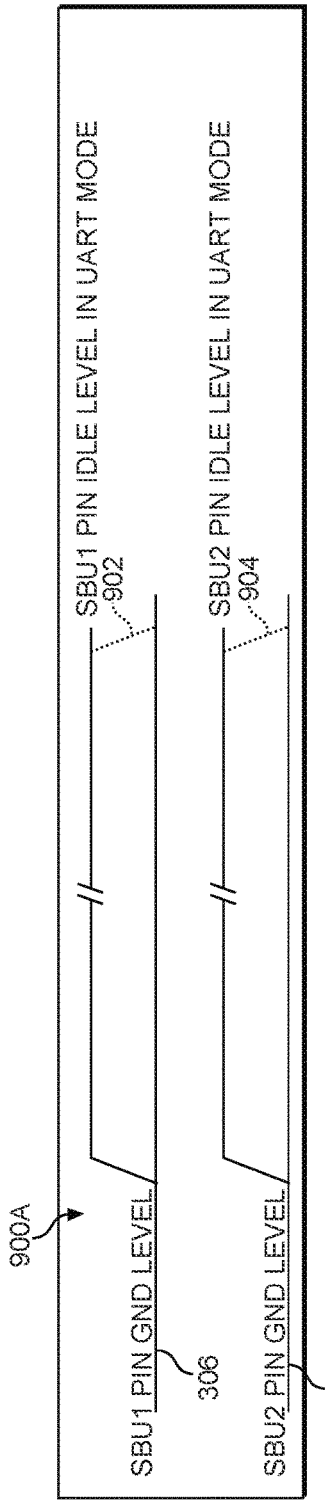
FIGS. 9A-9C illustrate various exemplary wake-up signals for ICs using the sideband mode changing techniques of the present disclosure.
Figure 9B:
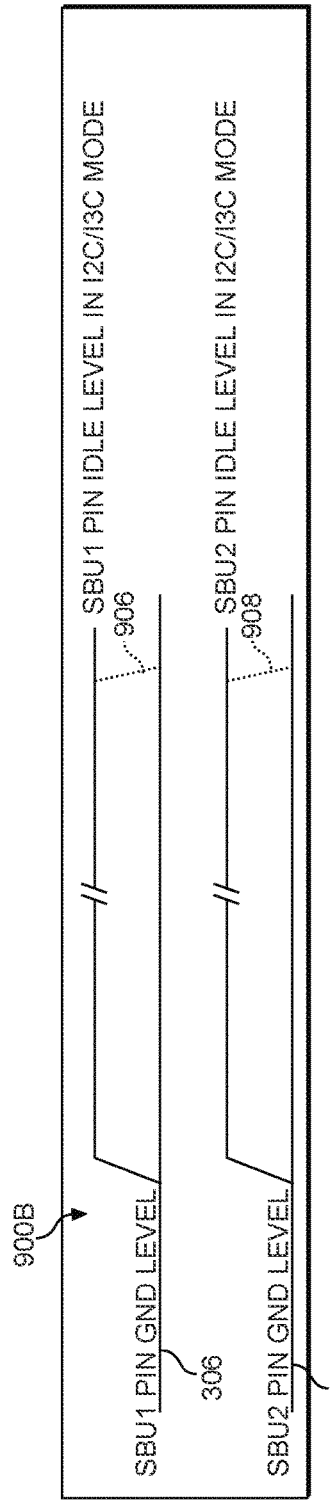
Figure 9C:
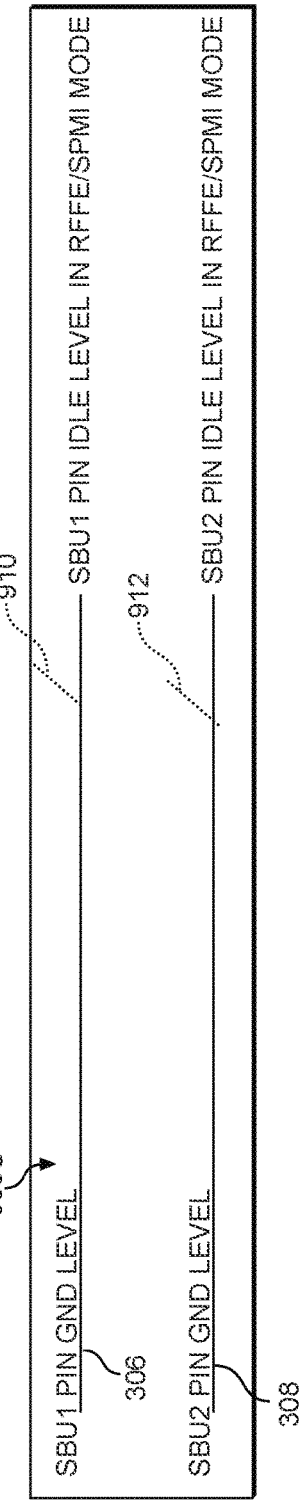

FIGS. 9A-9C illustrate exemplary wake-up mechanisms using the SBU pins 306, 308. Having predefined wake-up mechanisms for modes other than the default mode allows for wake up regardless of the mode from which the host/endpoint ICs went into a sleep or low-power mode. In this regard, FIG. 9A shows a wake-up mechanism 900A for a default UART mode. In a UART mode, the SBU pins 306, 308 are held at a logical high when idle or in a low-power mode. Thus, if either SBU pin 306, 308 transitions to a logical low at 902 or 904, then the link treats this as a wake-up interrupt and the counterpart device wakes up. Similarly, FIG. 9B shows a wake-up mechanism 900B for an I2C or I3C mode. In an I2C or I3C mode, the SBU pins 306, 308 are held at a logical high when idle or in a low-power mode. Thus, if either SBU pin 306, 308 transitions to a logical low at 906 or 908, then the link treats this as a wake-up interrupt and the counterpart device wakes up. Conversely, FIG. 9C shows a wake-up mechanism 900C for an RFFE or SPMI mode. In an RFFE or SPMI mode, the SBU pins 306, 308 are held at a logical low when idle or in a low-power mode. Thus, if either SBU pin 306, 308 transitions to a logical high at 910 or 912, then the link treats this as a wake-up interrupt and the counterpart device wakes up.

The sideband signaling in a USB Type-C communication link according to aspects disclosed herein may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

Figure 10:
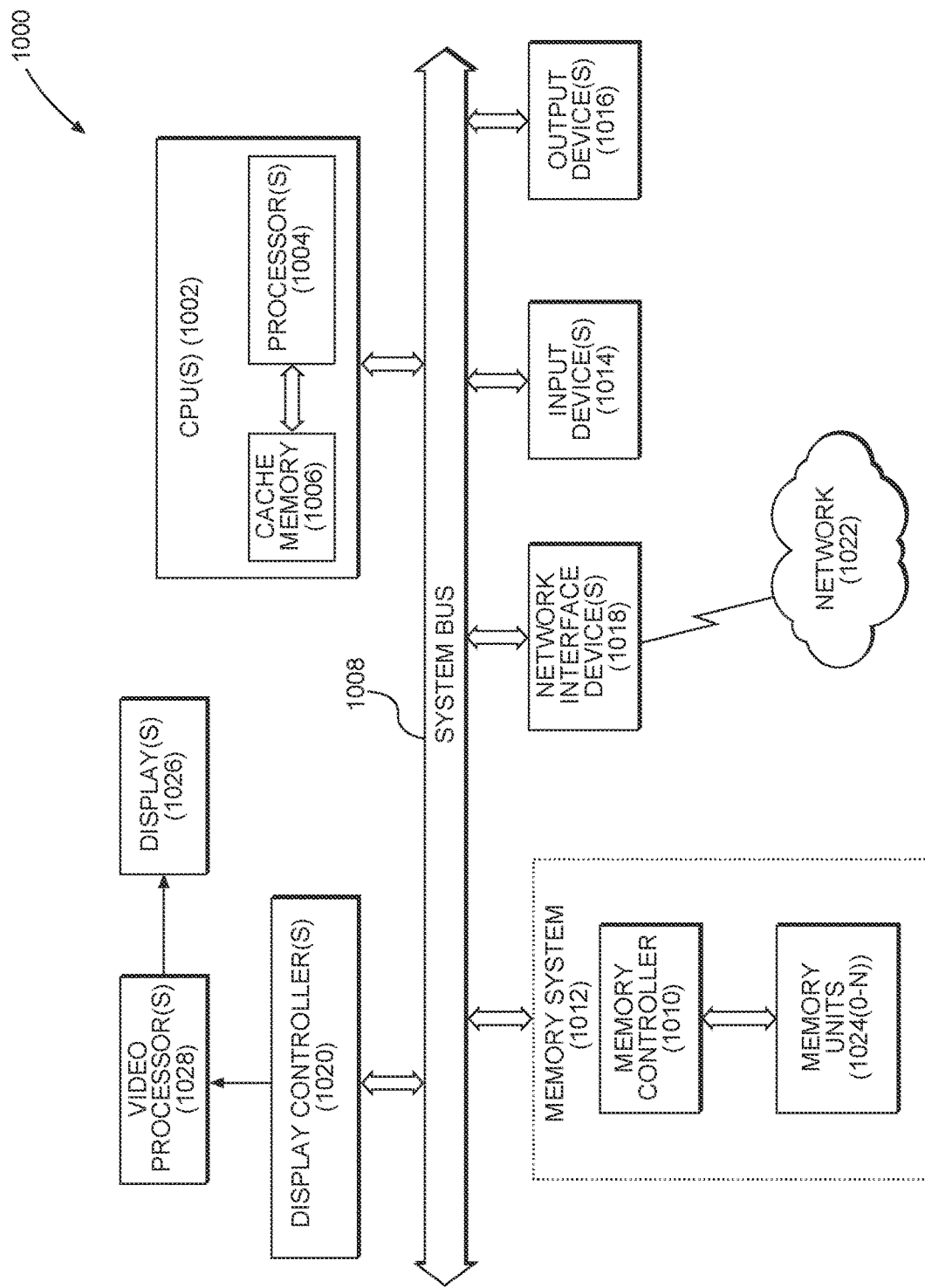
FIG. 10 is a block diagram of an exemplary processor-based system that can include the ICs of FIG. 2, 4, or 7.

More generally, in this regard, FIG. 10 illustrates an example of a processor-based system 1000 that can employ a USB subsystem such as that illustrated in FIG. 4. In this example, the processor-based system 1000 includes one or more central processing units (CPUs) 1002, each including one or more processors 1004. The CPU(s) 1002 may have cache memory 1006 coupled to the processor(s) 1004 for rapid access to temporarily stored data. The CPU(s) 1002 is coupled to a system bus 1008 and can intercouple master and slave (secondary) devices included in the processor-based system 1000. As is well known, the CPU(s) 1002 communicates with these other devices by exchanging address, control, and data information over the system bus 1008. For example, the CPU(s) 1002 can communicate bus transaction requests to a memory controller 1010 as an example of a slave (secondary) device.

Other master and slave (secondary) devices can be connected to the system bus 1008. As illustrated in FIG. 10, these devices can include a memory system 1012, one or more input devices 1014, one or more output devices 1016, one or more network interface devices 1018, and one or more display controllers 1020, as examples. The input device(s) 1014 can include any type of input device, including, but not limited to, input keys, switches, voice processors, etc. The output device(s) 1016 can include any type of output device, including, but not limited to, audio, video, other visual indicators, etc. The network interface device(s) 1018 can be any devices configured to allow exchange of data to and from a network 1022. The network 1022 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 1018 can be configured to support any type of communications protocol desired. The memory system 1012 can include one or more memory units 1024(0-N). While illustrated as being connected to the system bus 1008, in an exemplary aspect, the CPU(s) 1002 are connected to the network interface device(s) 1018 through a USB bus as described herein.

The CPU(s) 1002 may also be configured to access the display controller(s) 1020 over the system bus 1008 to control information sent to one or more displays 1026. The display controller(s) 1020 sends information to the display(s) 1026 to be displayed via one or more video processors 1028, which process the information to be displayed into a format suitable for the display(s) 1026. The display(s) 1026 can include any type of display, including, but not limited to, a cathode ray tube (CRT), a liquid crystal display (LCD), a plasma display, a light emitting diode (LED) display, etc.

Figure 11:
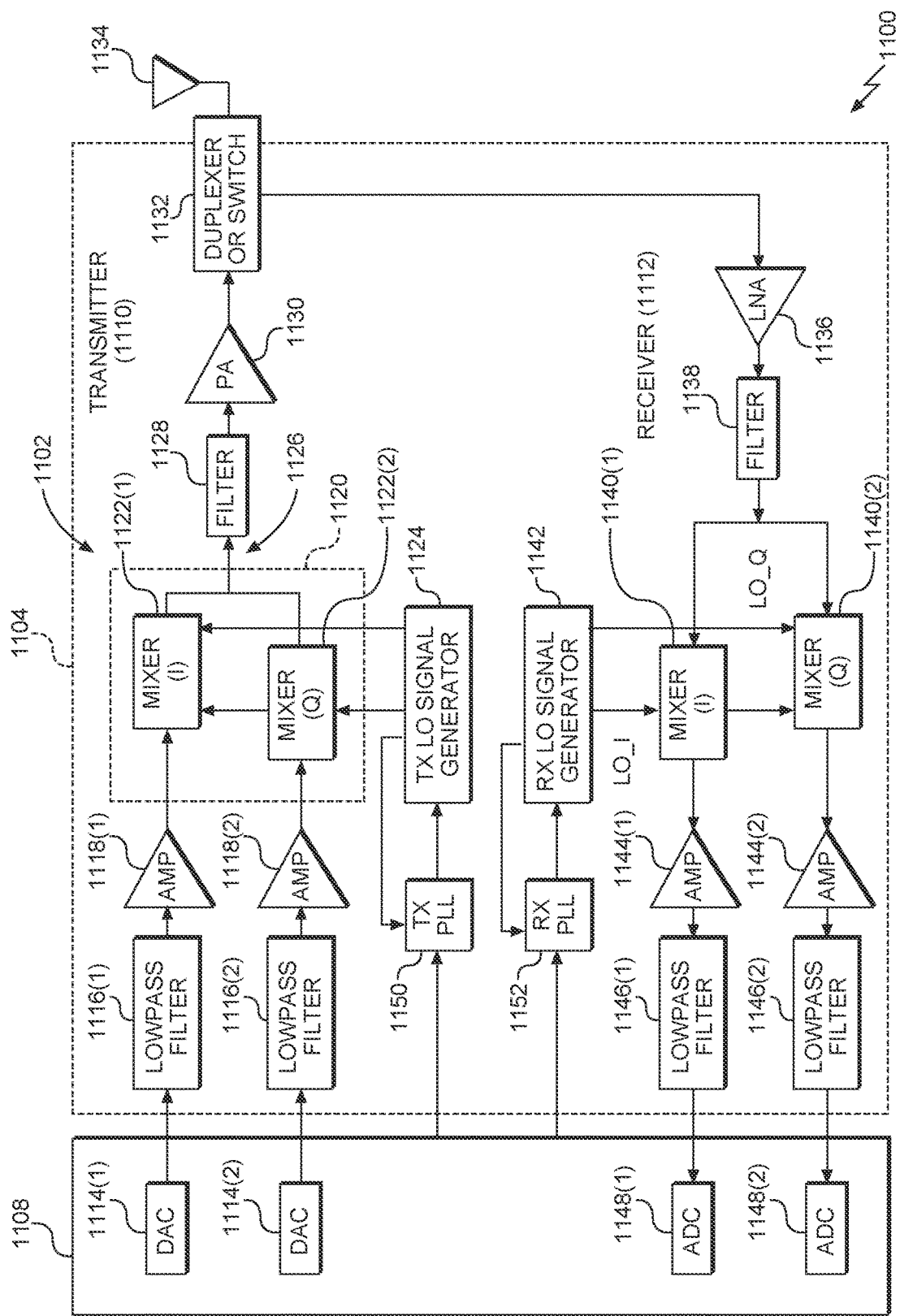
FIG. 11 is a block diagram of a transceiver architecture that may be used in the processor-based system of FIG. 10.

FIG. 11 illustrates an example of a wireless communications device 1100 which can include a USB subsystem operating according to exemplary aspects of the present disclosure. The wireless communications device 1100 may include or be provided in any of the above-referenced devices, as examples. As shown in FIG. 11, the wireless communications device 1100 includes a transceiver 1104 and a data processor 1108. The data processor 1108 may include a memory (not shown) to store data and program codes. The transceiver 1104 includes a transmitter 1110 and a receiver 1112 that support bi-directional communication. In general, the wireless communications device 1100 may include any number of transmitters and/or receivers for any number of communication systems and frequency bands. All or a portion of the transceiver 1104 may be implemented on one or more analog ICs, RF ICs (RFICs), mixed-signal ICs, etc.

A transmitter 1110 or a receiver 1112 may be implemented with a super-heterodyne architecture or a direct-conversion architecture. In the super-heterodyne architecture, a signal is frequency-converted between RF and baseband in multiple stages, e.g., from RF to an intermediate frequency (IF) in one stage, and then from IF to baseband in another stage. In the direct-conversion architecture, a signal is frequency converted between RF and baseband in one stage. The super-heterodyne and direct-conversion architectures may use different circuit blocks and/or have different requirements. In the wireless communications device 1100 in FIG. 11, the transmitter 1110 and the receiver 1112 are implemented with the direct-conversion architecture.

In the transmit path, the data processor 1108 processes data to be transmitted and provides I and Q analog output signals to the transmitter 1110. In the exemplary wireless communications device 1100, the data processor 1108 includes digital-to-analog-converters (DACs) 1114(1) and 1114(2) for converting digital signals generated by the data processor 1108 into the I and Q analog output signals, e.g., I and Q output currents, for further processing.

Within the transmitter 1110, lowpass filters 1116(1), 1116(2) filter the I and Q analog output signals, respectively, to remove undesired images caused by the prior digital-to-analog conversion. Amplifiers (AMPs) 1118(1), 1118(2) amplify the signals from the lowpass filters 1116(1), 1116(2), respectively, and provide I and Q baseband signals. An upconverter 1120 upconverts the I and Q baseband signals with I and Q transmit (TX) local oscillator (LO) signals from a TX LO signal generator 1122 through mixers 1124(1), 1124(2) to provide an upconverted signal 1126. A filter 1128 filters the upconverted signal 1126 to remove undesired images caused by the frequency upconversion as well as noise in a receive frequency band. A power amplifier (PA) 1130 amplifies the upconverted signal 1126 from the filter 1128 to obtain the desired output power level and provides a transmit RF signal. The transmit RF signal is routed through a duplexer or switch 1132 and transmitted via an antenna 1134.

In the receive path, the antenna 1134 receives signals transmitted by base stations and provides a received RF signal, which is routed through the duplexer or switch 1132 and provided to a low noise amplifier (LNA) 1136. The duplexer or switch 1132 is designed to operate with a specific RX-to-TX duplexer frequency separation, such that RX signals are isolated from TX signals. The received RF signal is amplified by the LNA 1136 and filtered by a filter 1138 to obtain a desired RF input signal. Downconversion mixers 1140(1), 1140(2) mix an output of the filter 1138 with I and Q receive (RX) LO signals (i.e., LO_I and LO_Q) from an RX LO signal generator 1142 to generate I and Q baseband signals. The I and Q baseband signals are amplified by AMPs 1144(1), 1144(2) and further filtered by lowpass filters 1146(1), 1146(2) to obtain I and Q analog input signals, which are provided to the data processor 1108. In this example, the data processor 1108 includes analog-to-digital-converters (ADCs) 1148(1), 1148(2) for converting the analog input signals into digital signals to be further processed by the data processor 1108.

In the wireless communications device 1100 in FIG. 11, the TX LO signal generator 1122 generates the I and Q TX LO signals used for frequency upconversion, while the RX LO signal generator 1142 generates the I and Q RX LO signals used for frequency downconversion. Each LO signal is a periodic signal with a particular fundamental frequency. A transmit (TX) phase-locked loop (PLL) circuit 1150 receives timing information from data processor 1108 and generates a control signal used to adjust the frequency and/or phase of the TX LO signals from the TX LO signal generator 1122. Similarly, a receive (RX) phase-locked loop (PLL) circuit 1152 receives timing information from the data processor 1108 and generates a control signal used to adjust the frequency and/or phase of the RX LO signals from the RX LO signal generator 1142.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein, but is to be accorded the widest scope consistent with the principles and novel features disclosed herein.

What is claimed is:

1. An integrated circuit (IC), comprising:
    a communication link interface comprising:
        a two-wire interface comprising a low-speed interface; and
        a high-speed interface operative at a high speed greater than a low speed associated with the low-speed interface; and
    a control circuit coupled to the communication link interface and configured to:
        use a current mode based messaging over the low-speed interface to negotiate a transition to a new mode for communications with a remote IC over the two-wire interface, wherein a first protocol corresponds to the current mode;
        transition to using a new protocol corresponding to the new mode;
        operate using the new protocol;
        subsequently, change operation from the second protocol back to the first protocol using the new mode based messaging;
        while in an idle mode, hold at least one wire of the two-wire interface in a default idle mode;
        detect a transition on the at least one wire to a changed mode different than the idle mode; and
        responsive to the transition on the at least one wire, begin a wake-up process.

2. The IC of claim 1, wherein the initial protocol comprises a Universal Asynchronous Receiver/Transmitter (UART) protocol.

3. The IC of claim 1, wherein the two-wire interface comprises a portion of a Universal Serial Bus (USB) interface.

4. The IC of claim 3, wherein the two-wire interface comprises a sideband use (SBU) interface within the USB interface.

5. The IC of claim 1, wherein the second protocol is selected from the group consisting of: Line multiplex-Universal Asynchronous Receiver/Transmitter (UART) (LM-UART), I2C, I3C, radio frequency front end (RFFE), and system power management interface (SPMI).

6. The IC of claim 1, wherein the two-wire interface is configured to operate in a differential signaling mode.

7. An integrated circuit (IC), comprising:
    a communication link interface comprising:
        a two-wire interface comprising a low-speed interface; and
        a high-speed interface operative at a high speed greater than a low speed associated with the low-speed interface; and
    a control circuit coupled to the communication link interface and configured to:

use a current mode based messaging over the low-speed interface to negotiate a transition to a new mode for communications with a remote IC over the two-wire interface, wherein a first protocol corresponds to the current mode;

transition to using a new protocol corresponding to the new mode;

operate using the new protocol;

subsequently, change operation from the second protocol back to the first protocol using the new mode based messaging;

while in an idle mode, hold at least one wire of the two-wire interface in a default idle mode;

determine that a wake up is needed;

wake up the IC; and drive the at least one wire of the two-wire interface to initiate the wake up at the remote IC.

8. The IC of claim 1, wherein the IC further comprises a host IC.

9. The IC of claim 1, wherein the IC further comprises a secondary IC.

10. The IC of claim 1 integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

11. The IC of claim 7, wherein the initial protocol comprises a Universal Asynchronous Receiver/Transmitter (UART) protocol.

12. The IC of claim 7, wherein the two-wire interface comprises a portion of a Universal Serial Bus (USB) interface.

13. The IC of claim 12, wherein the two-wire interface comprises a sideband use (SBU) interface within the USB interface.

14. The IC of claim 7, wherein the second protocol is selected from the group consisting of: Line multiplex-Universal Asynchronous Receiver/Transmitter (UART) (LM-UART), I2C, I3C, radio frequency front end (RFFE), and system power management interface (SPMI).

15. The IC of claim 7, wherein the two-wire interface is configured to operate in a differential signaling mode.

16. The IC of claim 7, wherein the IC further comprises a host IC.

17. The IC of claim 7, wherein the IC further comprises a secondary IC.

18. The IC of claim 7 integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

19. A computing system comprising:

a communication bus including a two-wire bus and a high-speed bus operative at a high speed greater than a low speed associated with the two-wire bus;

a first integrated circuit (IC), comprising:
 a first two-wire interface coupled to the two-wire bus;
 a high-speed interface coupled to the high-speed bus; and
 a first control circuit coupled to the first two-wire interface and configured to:
  using an initial protocol_transmitting messages, negotiate a transition to a second protocol for communications with a secondary IC over the first two-wire interface;
  transition to using the second protocol;
  operate using the second protocol; and
  subsequently change back to using the initial protocol; and the secondary IC comprising:
 a secondary two-wire interface coupled to the two-wire bus; and
 a secondary control circuit coupled to the secondary two-wire interface and configured to:
  responsive to negotiations from the first control circuit, transition to using the second protocol; and
  operate using the second protocol.

* * * * *